(12) United States Patent
Goldstein et al.

(10) Patent No.: US 6,957,334 B1
(45) Date of Patent: Oct. 18, 2005

(54) METHOD AND SYSTEM FOR SECURE GUARANTEED TRANSACTIONS OVER A COMPUTER NETWORK

(75) Inventors: Theodore C. Goldstein, Palo Alto, CA (US); Paul H. Rubin, Milpitas, CA (US)

(73) Assignee: MasterCard International Incorporated, Purchase, NY (US)

( * ) Notice: Subject to any disclaimer, the term of this patent is extended or adjusted under 35 U.S.C. 154(b) by 942 days.

(21) Appl. No.: 09/598,016

(22) Filed: Jun. 20, 2000

Related U.S. Application Data

(60) Provisional application No. 60/140,608, filed on Jun. 23, 1999.

(51) Int. Cl.[7] .................................. G06F 1/26
(52) U.S. Cl. ................ 713/170; 713/176; 713/180; 713/182
(58) Field of Search .................... 713/170, 176, 713/180, 182

(56) References Cited

U.S. PATENT DOCUMENTS

| | | | |
|---|---|---|---|
| 5,715,314 A | 2/1998 | Payne et al. | |
| 5,802,497 A | 9/1998 | Manasse | |
| 5,875,296 A | 2/1999 | Shi et al. | |
| 5,878,141 A * | 3/1999 | Daly et al. | 705/78 |
| 5,903,878 A * | 5/1999 | Talati et al. | 705/26 |
| 5,960,411 A | 9/1999 | Hartman et al. | |
| 6,092,196 A | 7/2000 | Reiche | |

FOREIGN PATENT DOCUMENTS

| | | |
|---|---|---|
| WO | WO 96/42041 | 12/1996 |
| WO | WO 98/47091 | 10/1998 |
| WO | PCT/US98/24091 | 11/1998 |
| WO | PCT/US98/24092 | 11/1998 |
| WO | WO 98/58306 | 12/1998 |
| WO | WO 99/24891 | 5/1999 |
| WO | WO 99/24892 | 5/1999 |

OTHER PUBLICATIONS

Lincoln Stein and Doug MacEachern, *Writing Apache Modules with Perl and C*, pp 213-21-9, 304-322, O'Reilly & Associates, 1999.

Chapter 24.5 Kerbeos, pp 566-571, Bruce Schneier, *Applied Cryptograph, Second Edition*, John Wiley & Sons, New York, 1996.

Lincoln Stein and Doug MacEachern, Writing Apache Modules with Perl and C, pp. 213-222, O'Reilly & Assocs., 1999.

Chapter 24.5 Kerberos, pp. 566-571, Bruce Schneier, Applied Cryptography 2nd Ed., John Wiley & Sons, 1996.

\* cited by examiner

*Primary Examiner*—Thomas R. Peeso
(74) *Attorney, Agent, or Firm*—Baker Botts LLP; Manu J. Tejwani

(57) ABSTRACT

A trusted third-party authentication protocol that facilitates secure commercial transactions over computer networks between a merchant and a user. The method and system of the present invention generally involves three entities: 1) a guarantor, which acts as a trusted arbitrator, 2) a merchant, and 3) a consumer or user. In one embodiment, the guarantor authenticates users and provides authentication documents back to the user for use in transactions with merchants. The authentication document generated by the guarantor can be used as a means to validate a user's identity and/or to provide authorization/validation of a specific transaction.

21 Claims, 3 Drawing Sheets

METHOD AND SYSTEM FOR SECURE GUARANTEED TRANSACTIONS OVER A COMPUTER NETWORK

RELATED APPLICATION

The present application claims priority from Provisional Application Ser. No. 60/140,608, filed Jun. 23, 1999 and entitled "Method and System for Secure Guaranteed Transactions Using Conventional Public Key Protocols."

FIELD OF THE INVENTION

The present invention relates to computer networks and, more particularly, relates to secure guaranteed transactions over computer networks.

BACKGROUND OF THE INVENTION

The increasing use of wide area networks such as the Internet has resulted in an explosion in the provision of on-line services. Computer users can access a vast wealth of information and services by utilizing a wide area network to establish a connection with other computers connected to the network.

The Internet is a global network of millions of computers belonging to various commercial and non-profit entities such as corporations, universities, and research organizations. The computer networks of the Internet are connected by gateways that handle data transfer and conversion of messages from a sending network to the protocols used by a receiving network. The Internet's collection of networks and gateways use the TCP/IP protocol. TCP/IP is an acronym for Transport Control Protocol/Internet Protocol, a software protocol developed by the Department of Defense.

Typically, the computers connected to a wide area network such as the Internet are identified as either servers or clients. A server is a computer that stores files that are available to other computers connected to the network. A client is a computer connected to the network that accesses the files and other resources provided by a server. To obtain information from a server, a client computer makes a request for a file or information located on the server using a specified protocol. Upon receipt of a properly formatted request, the server downloads the file to the client computer.

The World Wide Web is a system of Internet servers using specified Internet protocols and supporting specially formatted documents. The HyperText Transfer Protocol ("HTTP") is the underlying protocol used by the World Wide Web. HTTP defines how messages are formatted and transmitted, and what actions Web servers and browsers should take in response to various commands. The other main standard of the World Wide Web is Hyper-Text Markup Language ("HTML"), which covers how documents and files are formatted and displayed. HTML supports links to other documents, as well as graphics, audio, and video files.

Users typically access the content contained on the Internet and the World Wide Web with an Internet Browser, which is a software application used to locate and display web pages. A Web page is a document on the World Wide Web. Every Web page or file on a web server is identified by a unique Uniform Resource Locator. A Uniform Resource Locator ("URL") is the global address of files and other resources on the Internet. The address indicates the protocol being used and specifies the IP address or the domain name where the file or resource is located. Typically, a URL identifies the name of the server and the path to a desired file on the server. For example, a URL for a web server may be constructed as follows: "http://<server>/<filepath>", where <server> identifies the server on which the file is located and <filepath> identifies the path to the file on the server.

Thus, with the name of the server and the correct path to a file, a properly formatted URL accesses a desired file on a server connected to the World Wide Web.

There are myriad documents and files corresponding to a vast array of information and services accessible on the Internet. Indeed, the Internet has quickly become a means for not only obtaining information, but for conducting commercial transactions. For example, many consumers use the Internet to access on-line merchant sites and order books, compact discs and the like. Such commercial transactions conducted over the Internet require the consumer to provide some form of payment information, such as a credit card type, number and expiration date. However, one of the main disadvantages of conducting transactions over a computer network is the merchant's inability to verify that the user at the other end is who he purports to be and is authorized to make the purchase at issue with the method of payment he specifies. Accordingly, numerous authentication protocols involving computer networks are known in the art. See generally Schneier, *Applied Cryptography: Protocols, Algorithms, and Source Code in C*, 2d Ed. (John Wiley & Sons, Inc. 1996). For example, Kerberos is a trusted third-party authentication protocol. Kerberos is based on symmetric cryptography and shares different secret keys with every entity connected to the computer network. In Kerberos, knowledge of the secret key or a password that yields the secret key is proof of identity. However, the use of secret keys requires that all entities on the network must register and store secret keys with a central trusted authority. The large number of entities connected to the Internet, for example, renders the implementation of a central authenticating agency inapposite to the efficient operation of commercial transactions over the Internet. Accordingly, a need exists for a novel method and system for the secure guarantee of commercial transactions conducted over a large-scale computer network. The present invention substantially fulfills this need.

SUMMARY OF THE INVENTION

The present invention provides a trusted third-party authentication protocol that facilitates secure commercial transactions over computer networks between a merchant and a user. The method and system of the present invention generally involves three entities: 1) a guarantor, which acts as a trusted arbitrator, 2) a merchant, and 3) a consumer or user. In one embodiment, the guarantor authenticates users and provides authentication documents back to the user for use in transactions with merchants. The authentication document generated by the guarantor can be used as a means to validate a user's identity and/or to provide authorization/validation of a specific transaction. In one embodiment, when the user accesses the intended merchant's site on a computer network, the authentication document is uploaded to the merchant. In one embodiment, the merchant validates the authentication document and completes the transaction. In one embodiment, the present invention uses public or shared key encryption techniques and protocols to prepare and transmit encrypted authentication guarantees to merchants. According to one embodiment of the invention, these authentication documents are encrypted in a form that an intended merchant can decrypt. In one embodiment, the merchant decrypts the authentication document and processes the user's transaction request if the authentication document is valid.

More specifically, the present invention, in one embodiment, provides a method for providing secure guaranteed transactions over a computer network. In one embodiment, a method according to the present invention generally comprises (a) authenticating a user and receiving a recipient merchant request; (b) generating an authentication document, if the user is authentic; (c) adding a digital signature to the authentication document; and, (d) transmitting the authentication document to the user. In one embodiment, the method further comprises encrypting the authentication document in a manner the recipient merchant can decrypt before transmitting it. According to one embodiment, when the user accesses the recipient merchant's site, the encrypted authentication document is uploaded. In embodiments involving encrypted authentication documents, the recipient merchant decrypts the authentication document with a private or shared key. The recipient merchant verifies the digital signature and may also validate the remainder of the authentication document.

In one embodiment, the encrypted authentication document is packaged as an open cookie before being transmitted to the user. The user's browser receives the open cookie, which is automatically uploaded to the recipient merchant site, when the user navigates to it. An open cookie, in one embodiment, is a string of text that is presented or available to other web sites and web servers. In another embodiment, the open cookie is a string of data inserted, typically as a parameter, into a URL or link corresponding to the intended or recipient merchant.

The authentication document, when included with a digital signature, acts as a guarantee by the issuing entity (here, called a guarantor) that the user in possession of it has been authenticated. For example, and in one embodiment, the guarantor may be a credit agency or other financial institution, while the user may have a credit or savings account with the guarantor. According to one embodiment of the invention, the user logs on to the guarantor's site and is prompted for a user name and a password for authentication purposes. Of course, other means of authentication may be used. The user's password or an encrypted representation thereof is checked against the password value stored in the guarantor's database. If the values match, the user is authentic. In one embodiment, the user may then select a recipient merchant from which he desires to make a purchase and designate a method of payment, such as a credit card or an electronic check. The guarantor generates an authentication document, which includes for example, the identity of the user, a guarantee, a time stamp, and the user's credit card number and expiration date. In one embodiment, the authentication document also includes a transaction identifier or other challenge string supplied by the merchant that uniquely identifies the transaction being authenticated. As discussed more fully below, in one embodiment, the authentication document is signed by the guarantor and then encrypted with the public key of the recipient merchant.

As to the recipient merchant, the present invention contemplates that it trusts the guarantor and the guarantor's authentication of the user. Although the guarantor has been described as a financial institution, the guarantor, according to the invention, may be any entity trusted by the intended recipient merchant. Moreover, the functions performed by the guarantor may be incorporated into other electronic commerce related services, such as an electronic wallet provider. The recipient merchant may be a provider of goods, services and/or information. For example, the recipient merchant may be an on-line catalog site or an on-line services provider. Further, the recipient merchant may merely be a hosted application sitting on a web or Internet server allowing only authenticated users access to the application. According to this embodiment, the guarantor's authentication document serves as a form of ticket granting the user access to restricted services on a computer network. As one skilled in the art will recognize, the present invention centralizes the authentication of users and, therefore, minimizes the spread of password and other sensitive account information.

Another embodiment of the present invention is a system for providing secure guaranteed transactions over a computer network. In one embodiment, the system of the present invention comprises a database containing a list of user accounts and passwords corresponding to the user accounts and a server coupled to the database. In one embodiment, the server comprises (a) means for authenticating a user and receiving a recipient merchant request; (b) means for generating an authentication document; (c) means for adding a digital signature to the authentication document; and (d) means for transmitting the authentication document to the user. One embodiment of the present invention contemplates that transactions are conducted between a user and a recipient merchant and that the merchant has at least one public encryption key. In this embodiment, the system further comprises (e) means for encrypting the authentication document with the public key of the recipient merchant. Other embodiments contemplate the user of symmetric encryption algorithms and an encryption key that is shared between the recipient merchant and the guarantor. In this embodiment, the server further comprises means for encrypting the authentication document with a shared encryption key. In one embodiment, the server further includes means for packaging the encrypted authentication document as an open cookie.

DETAILED DESCRIPTION OF PREFERRED EMBODIMENTS

Figure 2:
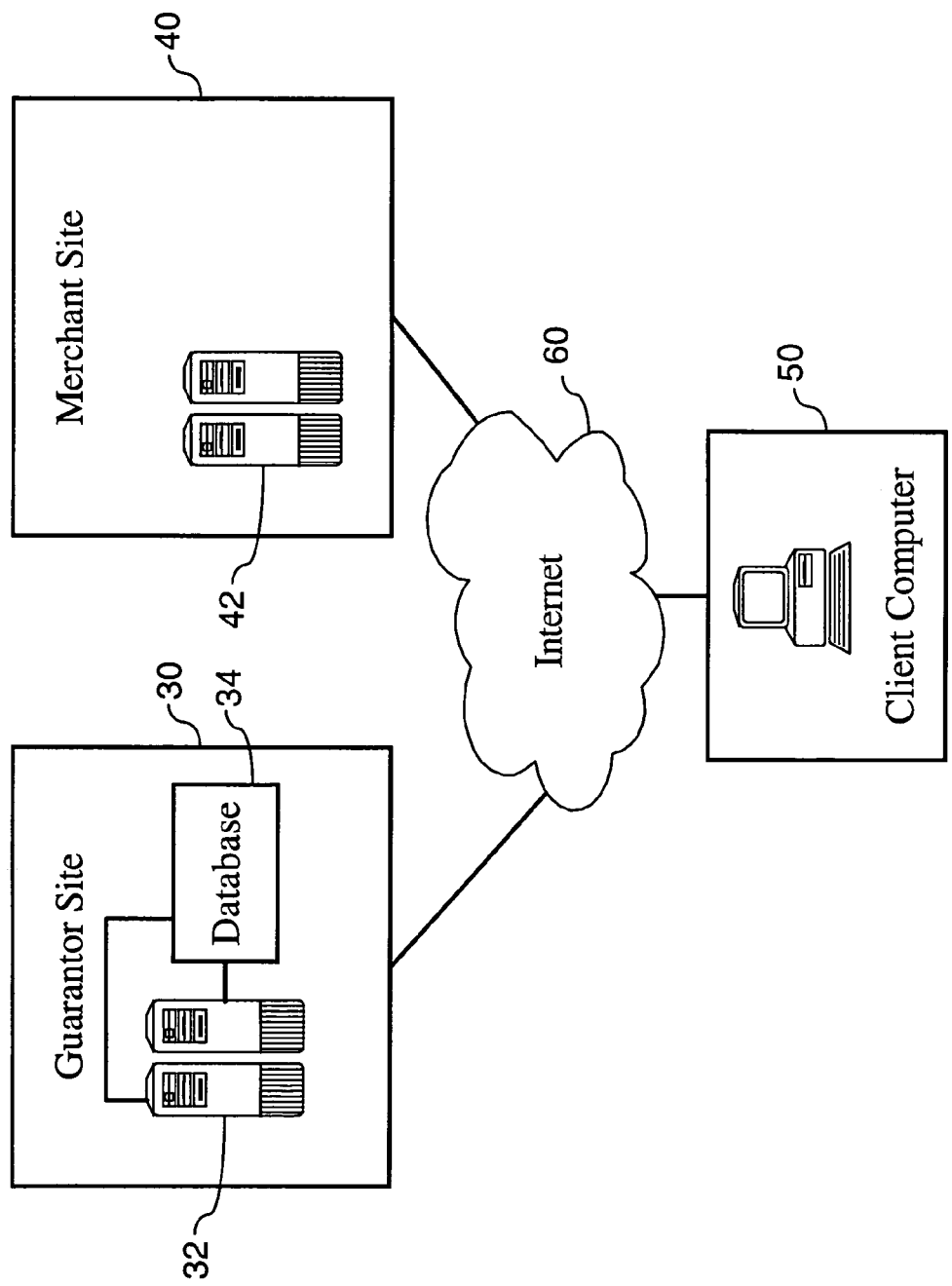
FIG. 2 is a block diagram illustrating a preferred embodiment of the present invention as applied to the Internet.

FIG. 2 illustrates an embodiment of the present invention as applied to the Internet 60. Of course, the present invention can be applied across any computer network.

As FIG. 2 illustrates, one embodiment of the present invention generally involves a guarantor, a merchant, and at least one user. In one embodiment, a user accesses an account stored on a database operably connected to servers 32 of guarantor site 30. Servers 32 receive and process authentication requests submitted by users. According to one embodiment, the user's account includes a user name, a password or an encrypted representation thereof, and payment information, such as a credit card type, number and expiration date. The database can be any database known in the art. In one form, the database is implemented in hardware including a collection of computer programs enabling the storage, modification, and extraction of information on the database. Database hardware may range from personal computers (for small systems) to mainframes (for large systems). Servers 32 may be implemented in hardware or software, or preferably a combination of both. In one embodiment, the server is implemented in computer programs executing on programmable computers each comprising at least one processor, a data storage system (including volatile and non-volatile media), at least one input device, and at least one output device. In one preferred embodiment, servers 32 are web or Internet servers operably connected to the Internet 60.

In the embodiment shown in FIG. 2, merchant site 40 is supported by web or Internet servers 42, which receive requests submitted by users and transmit files and other documents to users. In one embodiment, servers 42 are connected to the Internet 60.

As FIG. 2 shows, one embodiment of the present invention works in conjunction with a conventional computer having Internet Browsing Software and a connection to the Internet. The user's computer can be any conventional personal computer known in the art. In one preferred embodiment, the user's computer is connected to the Internet via a dial-up connection or through a network line. Such communication could also be wireless. Additionally, suitable Internet browsers for use with the present invention include NETSCAPE NAVIGATOR®, MICROSOFT INTERNET EXPLORER®, and any other suitable browser, including those suitable for wireless technologies, employing protocols, such as the Wireless Access Protocol (WAP). The browser implemented on client computer 50 preferably includes the functionality required to receive and transmit open cookies. In addition, preferred browsers for use with the present invention support the SSL ("Secure Sockets Layer") protocol, the S-HTTP ("Secure HTTP") protocol, the TLS or the WTLS protocol, or any other similar protocol for transmitting confidential or private information over an open computer network. In one embodiment, communication of passwords and sensitive data, such as authentication documents, for example, between guarantor site 30 and client computer 50 (or between client computer 50 and merchant site 40) employs the SSL protocol.

Figure 1:
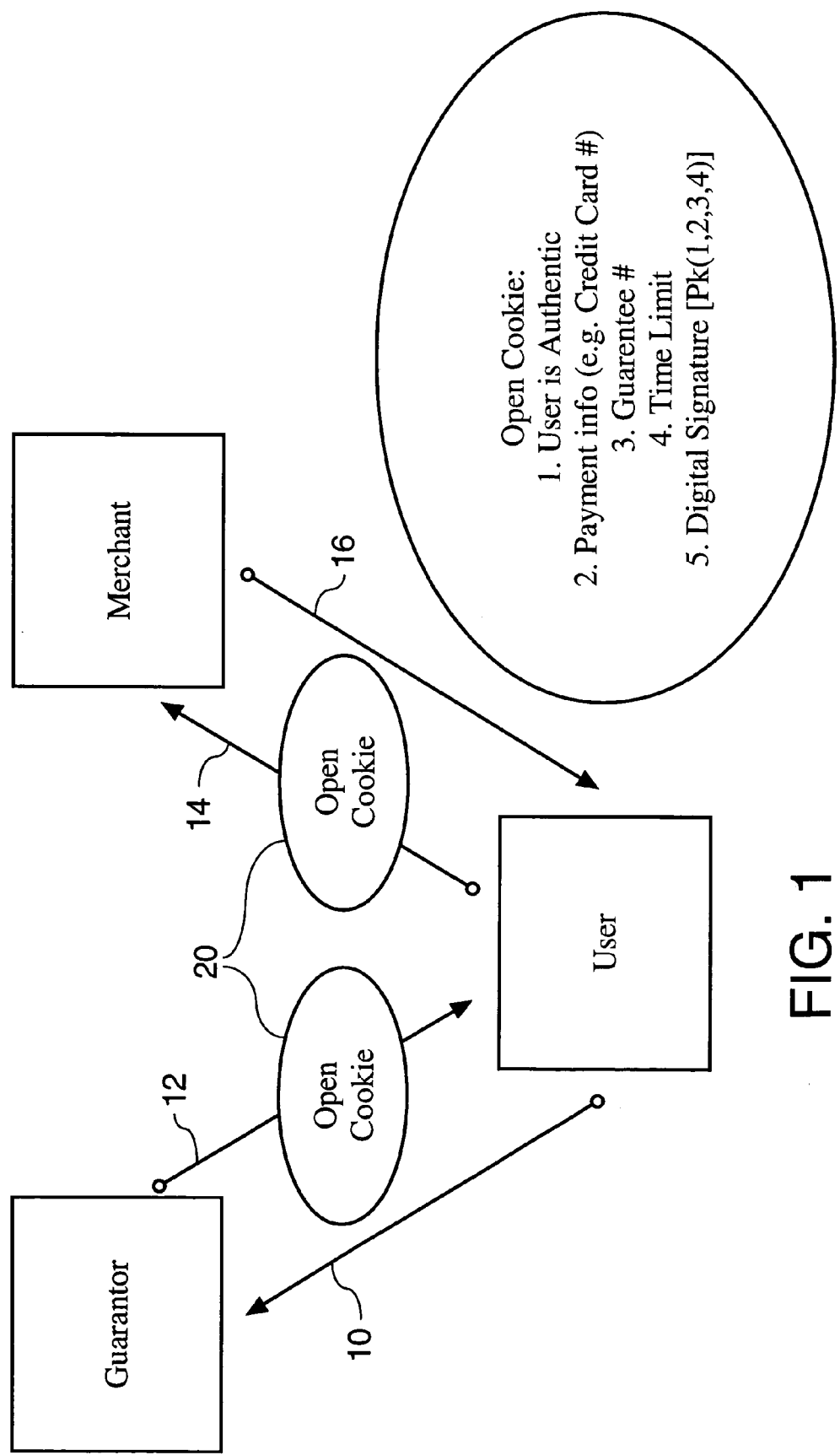
FIG. 1 is a block diagram broadly illustrating the flow of information among users, a guarantor and a merchant in one embodiment of the present invention.
Figure 3:
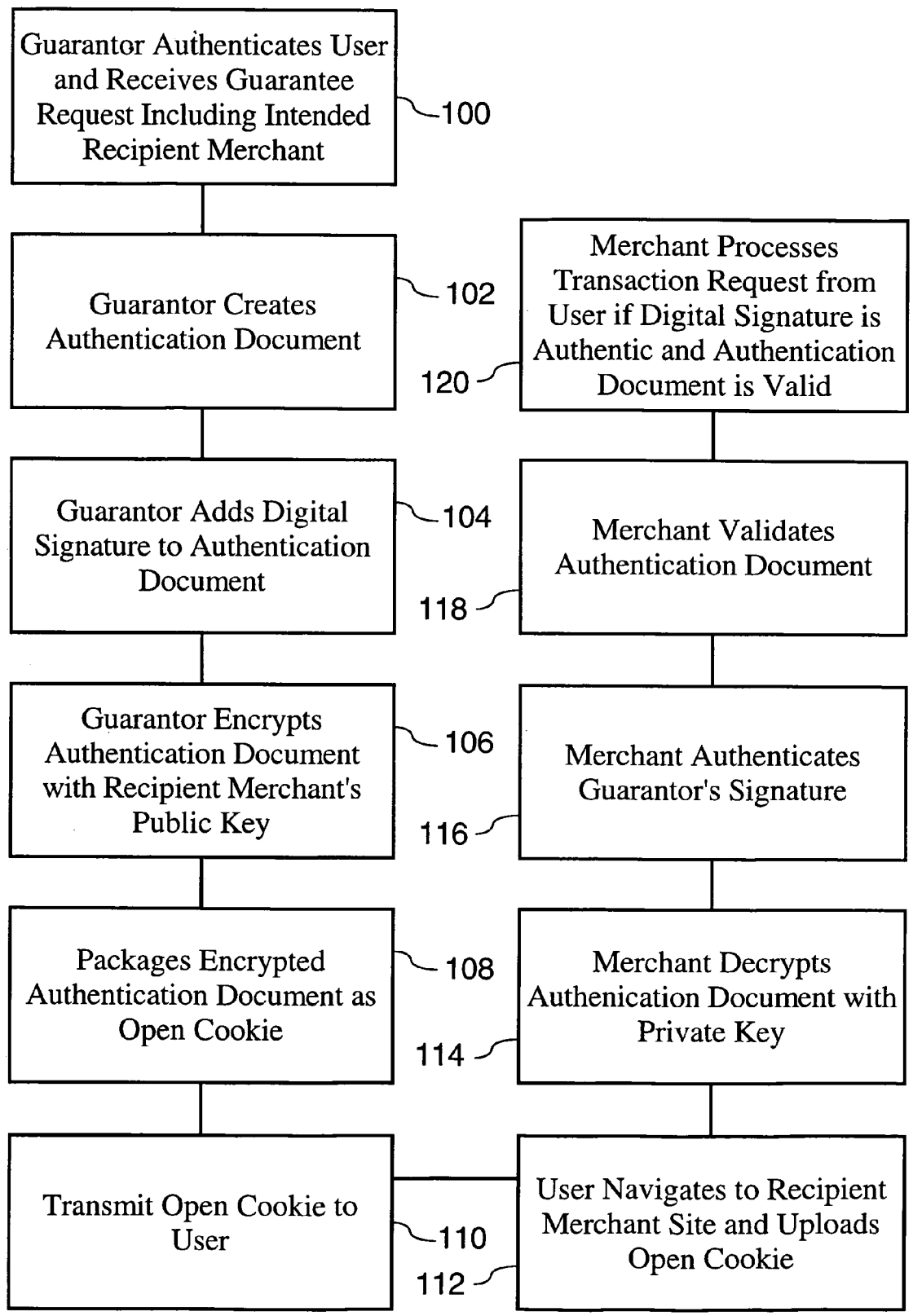
FIG. 3 is a flow-chart diagram showing a preferred embodiment of a method according to the invention.

FIGS. 1 and 3 illustrate the operation of one embodiment of the present invention. In use, a user directs the browser on client computer 50 to guarantor site 30, as is conventional. In one form, server 32 prompts the user for a user name and a password to authenticate the user (FIG. 3, step 100). Numerous authentication protocols are known in the art. The particular authentication protocol used is not critical to the invention. In one embodiment, the records corresponding to each user account contain the user name and a salted one-way hash of the user's password. Therefore, each user is authenticated by hashing the inputted password with the "salt" and comparing the result to the hash value stored in the user's record. If there is a match, the user is deemed to be authentic.

Upon proper authentication of the user, server 32, in one embodiment, prompts the user for the network address of the recipient merchant's site at which the user wishes to make a purchase or some other request. Server 32 accesses the record corresponding to the user and generates an authentication document (step 102). According to one embodiment, each user record may further include the user's full name, delivery and/or payment address, and preferred payment information. In one form, the authentication document includes the user's name, payment information (such as credit type, number and expiration date), a guarantee number, and a time limit beyond which the guarantee is no longer valid. In some embodiments, the authentication document may also include the user's preferred delivery address. In yet other embodiments, the guarantor may be a credit agency. According to this embodiment, the user can input an amount he contemplates spending. The guarantor can then include in the authentication document an indication that the user has a pre-approved spending limit of a certain specified amount. Of course, the authentication document can contain a vast array of information, including user preferences and additional hash values corresponding to the user's currently used machine number, as well as unique session IDs.

In step 104, guarantor 30 adds a digital signature to the authentication document. Various digital signature protocols are well known in the art. Digital signatures generally involve the encryption of a document with a secret (symmetric encryption) or private (asymmetric encryption) key. In one embodiment, a digital signature is created with the guarantor's secret key using a key-dependent, one-way hash function. Under this embodiment, a recipient merchant also has knowledge of this secret key and is, therefore, able to validate the digital signature. In another embodiment, however, the digital signature is generated with the guarantor's private key using an asymmetric encryption algorithm. Suitable digital signature algorithms include, but are not limited to, RSA and DSA. Similar digital signature methods include hashing the authentication document and encrypting the resulting hash value with the guarantor's private key. However, any suitable digital signature can be incorporated into the encrypted authentication document. In one embodiment the signed authentication document is then transmitted to the user for use in a transaction with the intended merchant recipient.

In one embodiment, server 32 encrypts the signed authentication document in a form the recipient merchant can decrypt before sending it to the user. In one embodiment, server 32 encrypts the signed authentication document with a public key of the recipient merchant (step 106). Suitable public-key encryption algorithms include RSA and ElGamal. In another embodiment, the signed authentication document is encrypted with a symmetric encryption algorithm and a key shared between at guarantor site 30 and merchant site 40.

In one embodiment, the encrypted authentication document is packaged as an open cookie 20 (step 108) and transmitted to client computer 50 (step 110). In one embodiment, the open cookie 20 is transmitted simultaneously with a web page containing a hyperlink to the recipient merchant's web site. In one embodiment, the open cookie is a REDIRECT message comprising a string of data inserted as a parameter into a URL corresponding to merchant site 40. In one embodiment, the data is encrypted with either a private key (to be decrypted with a public key) or a shared key. In one embodiment, a user authenticates himself by entering a password and clicking on a link to a redirection engine at guarantor site 30. In one embodiment, the redirection engine computes the contents of the open cookie and composes a URL or link comprising the recipient merchant site's address, the authentication document, and, in one embodiment, any other parameters required by merchant site 40.

When the user navigates his browser to recipient merchant site 40, the open cookie 20 is uploaded (step 112 & FIG. 1, Ref. No. 14). In embodiments where the authentication document is encrypted, server 42 supporting merchant site 40 decrypts the authentication document in the open cookie 20 with the recipient merchant's private key or, depending on the embodiment, the shared key (step 114).

Recipient merchant server 42 may then authenticate the guarantor's digital signature using conventional techniques known in the art (step 116). According to one embodiment, server 42 also validates the authentication document (step 118). Namely, and in one preferred embodiment, server 42 compares the actual time to the time limit specified in the authentication document. If the current time value is less than the time limit value, then the user's request may be processed. Validation step 118 may further include comparing the pre-approved credit limit specified in the authentication document to the purchase amount. In one form, server 42 can also use the relevant information contained in open cookie to fill in the various fields appearing in the order form provided by merchant site 40.

Additionally and in one embodiment, after the transaction is completed at merchant site 40, the user can be directed back to guarantor site 30. The user may specify another merchant site to which he wishes to navigate. In one embodiment, guarantor 30 re-encrypts the authentication document with the public key of the new specified merchant or generates an entirely new authentication document with a new time stamp or time limit. In other embodiments, merchant site 40 may re-encrypt the authentication document with the public key of the next intended recipient merchant.

Still further, embodiments of the present invention also contemplate the sharing of a private key and corresponding public key by more than one merchant site. Under this embodiment, each participating merchant site has knowledge of a shared private key. The guarantor encrypts the authentication document with the corresponding public key. Accordingly, each participating merchant has access to the encrypted authentication document and may validate it. Under this embodiment, the user may navigate among participating merchant sites without the need for re-encryption of the authentication document.

In one embodiment, the authentication document can be used to authorize specific transactions. In one such embodiment of the present invention, merchant site 40 issues a unique merchant transaction identifier that guarantor site 30 incorporates into the authentication document. The merchant transaction identifier can be supplied in several ways. In one embodiment, merchant site 40 sends a merchant transaction identifier to guarantor site 30 by transmitting a HTTP REDIRECT message with transaction information, including the merchant transaction identifier to the user. For example, when a user transmits to merchant site 30 a request to order a product or service, merchant site 30 may construct a REDIRECT message. In one embodiment, the REDIRECT message comprises a page or other document including the computer network address of guarantor site 30 and the merchant transaction identifier and any other suitable transaction parameters. For example, the REDIRECT message may include a hypertext link or URL, such as "http://www.guarantor.com/?TRANSACTIONID=123456&AMOUNT=$789.00&MERCHANT=www.merchant.com". When the user clicks on the link or otherwise activates the URL in the REDIRECT message, the merchant transaction identifier and any other parameters included in the message are transmitted to guarantor site 30 as part of the recipient merchant request. In one embodiment, guarantor site 30, if it approves the transaction, includes the merchant transaction identifier in the authentication document discussed above, signs the authentication document and transmits it to the user. In one embodiment, the authentication document is included as part of another REDIRECT message, which, when the link or URL in the message is activated, causes browser 62 to transmit the authentication document to merchant site 40. In one embodiment, merchant site 40 validates the authentication document, as discussed above, and completes the transaction.

In another embodiment, merchant site 40 provides the merchant transaction identifier in a field included in a form transmitted to the user. According to one embodiment, the merchant transaction identifier is read from the form and transmitted to guarantor site 30 for inclusion in an authentication document. For example and in one embodiment, the merchant transaction identifier is embedded in a field specified in the Electronic Commerce Markup Language ("ECML") standard, an e-commerce standard available at www.ecml.org and published as the Internet Engineering Task Force RFC 2706 by Eastlake and Goldstein (incorporated by reference herein). The ECML standard specifies HTML fields that allow a merchant and a user to communicate. One such field, Ecom_ConsumerOrderID can be embedded as an HTML text field in an HTML form. For example, to represent the same merchant transaction identifier described above, a merchant transaction server embeds the following: <input type= hidden name= Ecom_ConsumerOrderID value="transactionID=123456">. In one embodiment, the user's computer includes a software module, such as an electronic wallet, that scans the form for the merchant transaction identifier and transmits it to guarantor site 30. In one embodiment, the software module is configured to operate on order forms transmitted by merchants, including, in some embodiments, HTML forms complying with the ECML standard described above. In one such embodiment, the electronic wallet module, when the user directs it to complete the transaction, scans the order form for a merchant transaction identifier and transmits it to guarantor site 30. Guarantor site 30 composes and signs the authentication document, including the merchant transaction identifier, and transmits it to the user's computer. In one embodiment, the electronic wallet module completes the order form, includes or appends the authentication document, and transmits them back to the recipient merchant to complete the transaction. In embodiments involving the ECML standard, the software module inserts the authentication document into reserved fields in the order form. In another embodiment, guarantor site 30 composes and transmits to the user a URL including the computer network address corresponding to merchant site 40, the contents of the user's order, and the authentication document. When the user clicks on the URL, the order and the authentication document are transmitted to merchant site 40.

SUMMARY

With respect to the above-provided description, one skilled in the art will readily recognize that the present invention has application in a variety of contexts. The foregoing description illustrates the principles of the present invention and provides examples of its implementation. For example, although preferred embodiments are described as working in conjunction with an Internet browser, the present invention may be used in connection with any suitable software application for accessing files throughout a computer network. Accordingly, the above-provided description is not intended to limit the scope of the claims to the exact embodiments shown and described.

What is claimed is:

1. A method for providing secure guaranteed transactions over a computer network, said transactions conducted between a user and a recipient merchant, said method comprising the steps of
   a) authenticating a user;
   b) receiving a recipient merchant request;
   c) generating an authentication document, if said user is authentic;
   d) adding a digital signature to said authentication document; and
   e) transmitting said authentication document and a URL link comprising a recipient merchant site address to said user, whereby the user can access said recipient merchant site by activating said URL link.

2. A method for providing secure guaranteed transactions over a computer network, said transactions conducted between a user and a recipient merchant, said merchant having at least one public encryption key and a corresponding private key, said method comprising the steps of
   (a) authenticating a user;
   (b) receiving a recipient merchant request;
   (c) generating an authentication document, if said user is authentic;
   (d) adding a digital signature to said authentication document,
   (e) encrypting said authentication document with the public key of said recipient merchant; and
   (f) transmitting said encrypted authentication document to said user,
   wherein said transmitting step (f) further comprises the steps of packaging said encrypted authentication document as an open cookie; and transmitting said open cookie to said user.

3. An apparatus for providing secure guaranteed transactions over a computer network, said transactions conducted between a user and a recipient merchant, said user authenticated by a guarantor, said apparatus comprising:
   a database, said database containing a list user accounts and passwords, or encrypted representations thereof, corresponding to said user accounts; and
   a server operably coupled to said database, said server comprising:
      means for authenticating a user and receiving a recipient merchant request;
      means for generating an authentication document;
      means for adding a digital signature to said authentication document,
      means for generating a URL link comprising a recipient merchant site address; and
      means for transmitting said encrypted authentication document and said URL link to said user.

4. A method for providing secure guaranteed transactions over a computer network, said transactions conducted between a user and a recipient merchant, said merchant having at least one public encryption key, said user authenticated by a guarantor, said method comprising the steps of
   a) receiving an authentication document from a user, said authentication document encrypted with a public encryption key of said recipient merchant and including a digital signature;
   b) decrypting said authentication document with the corresponding private key of said recipient merchant;
   c) authenticating said digital signature; and
   d) processing the user's request, if said digital signature is authentic and said authentication document is valid, wherein said authentication document is packaged as an open cookie and wherein said receiving step (a) comprises uploading said open cookie.

5. A method for providing secure guaranteed transactions over a computer network, said transactions conducted between a user and a recipient merchant, said method comprising the steps of
   a) authenticating a user;
   b) receiving a recipient merchant request, said recipient merchant request including a merchant transaction identifier;
   c) generating an authentication document including said merchant transaction identifier, if said user is authentic;
   d) adding a digital signature to said authentication document; and
   e) transmitting said authentication document to said user, wherein said recipient merchant request originates from a merchant as a redirect message transmitted to said user.

6. The method of claim 1, wherein said merchant has at least one encryption key, further comprising the step of
   f) encrypting said authentication document with the encryption key of said merchant before performing said transmitting step (e).

7. The method of claim 6 wherein said encryption key is a shared encryption key between a guarantor and said merchant.

8. The method of claim 6 wherein said encryption key is a public key of said merchant.

9. The method of claim 1 or 2 wherein said authentication document includes payment information corresponding to said user.

10. The method of claim 9 wherein said authentication document further includes a guarantee number and a time stamp.

11. The method of claim 9 wherein said authentication document further includes a guarantee number and a time limit.

12. The method of claim 1, or wherein said authentication document is signed with a private key of said guarantor.

13. The method of claim 1, or wherein said digital signature in step (d) is created with a secret key of said guarantor using a key-dependent one way hash-function, and wherein said recipient merchant possesses said secret key.

14. The method of claim 1, or wherein said digital signature in step (d) is generated with a private key of said guarantor using an asymmetric algorithm.

15. The method of claim 1, or wherein said adding step (d) comprises the steps of
   (d1) hashing said authentication document;
   (d2) creating a digital signature by applying a public-key algorithm to said hashed authentication document using a private key of said guarantor; and
   (d3) adding said digital signature to said authentication document.

16. The method of claim wherein said public key and said private key are shared by at least two recipient merchants.

17. The apparatus of claim 3 wherein said merchant having at least one public encryption key, further comprising means for encrypting said authentication document with the public key of said recipient merchant.

18. The apparatus of claim 3 or 17 wherein said transmitting means further comprises means for packaging said authentication document as an open cookie.

19. The method of claim 4 wherein said authentication document includes payment information, wherein said user request is a purchase request, and wherein said processing step (d) further comprises using said payment information in said authentication document to complete a transaction.

20. The method of claim 4 wherein said recipient merchant request includes a merchant transaction identifier; and wherein said authentication document generated in step (c) includes said merchant transaction identifier.

21. The method of claim 20 wherein said recipient merchant request originates from a merchant as a redirect message transmitted to said user.

\* \* \* \* \*